United States Patent

[11] 3,596,054

[72] Inventors Igor Konstantinovich Pokhodnya
Pereulo K Mechnikova, 3, Kv. 21;
Valery Nikolaevich Shlepakov, Ulitsa
Pushkinskaya, 45, Kv. 9, both of Kiev,
U.S.S.R.
[21] Appl. No. 12,464
[22] Filed Feb. 18, 1970
[45] Patented July 27, 1971
[32] Priority Mar. 24, 1969
[33] U.S.S.R.
[31] 1313007

[54] WELDING WIRE
1 Claim, No Drawings

[52] U.S. Cl. .................................................. 219/146

[51] Int. Cl. .................................................. B23k 35/22
[50] Field of Search .......................................... 219/145,
146; 117/202—207; 148/24—26

[56] References Cited
UNITED STATES PATENTS
3,177,340 4/1965 Danhier.......................... 219/146

*Primary Examiner*—J. V. Truhe
*Assistant Examiner*—Lawrence A. Rouse
*Attorney*—Waters, Roditi, Schwartz & Nissen

ABSTRACT: A welding wire, characterized in that its powder core enclosed in a steel sheath, includes (in percent of the core weight) 4—12 percent of alumina and 1—4 percent of sodium fluosilicate.

WELDING WIRE

The invention relates to electrode materials for arc welding, more specifically to filler wires for open-arc welding and built-up welding.

This invention can be most effectively employed for welding in vertical and overhead positions.

In the conventional welding wires for open-arc welding and built-up welding the best properties are featured by the rutile-carbonate-fluorite-type wires, whose core comprises marble, fluorite concentrate, rutile concentrate, soda ash, ferromanganese, ferrosilicon, and iron powder. Such wires have fine welding and production properties, and secure high mechanical properties of the weld metal, in downhand welding within a wide range of welding conditions.

However, these filling wires do not secure stable quality of the weld metal, and reliable mechanical properties thereof, in welding thin metal and in vertical and overhead welding. Yet welding of thin metal, and welding in positions different from downhand work take a significant volume of welding operations, and are quite urgent.

The most important object of the present invention is to develop a welding wire for open-arc welding and built-up welding, wherein the composition of the core would provide for fine welding and production properties of the wire, and reliable mechanical properties of the weld metal within a wide range of welding conditions not only in downhand work, but also in vertical and overhead positions, as well as in welding thin metal.

This and other objects are achieved by means of a welding wire for open-arc steel welding and built-up welding, which consists of a steel sheath with a powder core comprising marble, fluorite concentrate, rutile concentrate, soda ash, ferromanganese, ferrosilicon, and iron powder, wherein, according to the invention, the powder core, besides the indicated constituents thereof taken in the following percentages of the core weight:

| | |
|---|---|
| marble | 8—15 |
| fluorite concentrate | 16—24 |
| rutile concentrate | 4—16 |
| soda ash | 4—18 |
| ferromanganese | 4—8 |
| ferrosilicon | 3—6, |
| includes alumina | 4—12 |
| and sodium fluosilicate | 1—4, |
| the rest being iron powder. | |

Wire having a core composition according to the invention, features adequate welding and production properties, and provides for high quality of weld metal in downhand, vertical, and overhead welding. The adequate properties are ensured within a range of welding conditions being quite sufficient in practice, which is very important, since the main method of vertical and overhead welding is the semiautomatic process.

The present invention will be more clearly understood from the exemplary embodiments thereof given in the following description.

The proposed welding wire for open-arc welding and built-up welding consists of a steel sheath with a powder core, comprising (in percent of the core weight):

| | |
|---|---|
| marble | 8—15 |
| fluorite concentrate | 16—24 |
| rutile concentrate | 4—16 |
| soda ash | 4—18 |
| ferromanganese | 4—8 |
| ferrosilicon | 3—6 |
| alumina | 4—12 |
| sodium fluosilicate | 1—4, |
| the rest being iron powder. | |

Combination of the mixture of calcium and sodium carbonates with a rutile-fluorite-aluminous slag system ensures adequate gas-and-slag protection of metal in open-arc welding. The chosen ratio of the core constituents permits obtaining a slag with fine physical properties helping to contain molten metal on the vertical plane and in overhead position.

Reduced gas content in metal is promoted by the presence in the core of sodium fluosilicate, which dissociates at a relatively low temperature.

The advantages of the proposed welding wire, as compared to conventional wires, are illustrated by the following examples.

A welding wire with a diameter of 2 mm., whose steel sheath takes 75 percent of the total wire weight, and has a core of the following composition:

| | |
|---|---|
| marble | 10% |
| fluorite concentrate | 20% |
| rutile concentrate | 6% |
| soda ash | 6% |
| ferromanganese | 6% |
| ferrosilicon | 4% |
| alumina | 6% |
| sodium fluosilicate | 1% |
| and iron powder | 41%, | provides for adequate formation of weld metal and easy separation of slag in making corner and butt welds in vertical and overhead positions. The welding process features good stability, metal losses for splashing are insignificant. Welding butt joints on carbon steel with a thickness of 2 mm. and more in vertical and overhead positions resulted in high mechanical properties of the weld metal.

| Position of weld | Tensile strength, kg./mm.$^2$ | Relative elongation, percent | Impact viscosity, kgm./cm.$^2$, at a temperature, t° C. of— | |
|---|---|---|---|---|
| | | | +20 | −40 |
| Vertical | 48–50 | 28–32 | 18–21 | 12–14 |
| Overhead | 49–51 | 24–30 | 17–20 | 10–13 |

The welding conditions are as follows:

a. in vertical position welding current I=170—190a arc voltage U=20—21v;

b. in overhead position welding current I=180—200a arc voltage U=20—22v.

A welding wire with a diameter of 2.2 mm., whose steel tube makes up 72.5 percent of the total wire weight and comprises in its core:

| | |
|---|---|
| marble | 12% |
| fluorite concentrate | 22% |
| rutile concentrate | 16% |
| soda ash | 8% |
| ferromanganese | 6.4% |
| ferrosilicon | 4.6% |
| alumina | 7% |
| sodium fluosilicate | 4% |
| iron powder | 20%, | features excellent welding and production properties in downhand and vertical welding. The mechanical properties of the weld metal and the weld joint are at a high level, which is proved by the following data.

| Position of weld | Tensile strength, kg./mm.² | Relative elongation, percent | Impact viscosity, kg./cm.² at a t° C. of | |
|---|---|---|---|---|
| | | | +20 | −40 |
| Downhand | 51.6–52.4 / 52.0 | 26.6–30.4 / 28.4 | 17.3–18.6 / 17.8 | 9.6–11.0 / 10.2 |
| Vertical | 53.7–56.1 / 54.2 | 25.7–29.1 / 28.0 | 16.0–18.5 / 17.7 | 7.0–9.5 / 8.9 |

NOTE.—Given in the numerator are the extreme value, and in the denominator the average values, of the results of testing 3–6 samples. Welding was carried out with direct current of reverse polarity.

The welding conditions were as follows:

a. in downhand position welding current I=260—280a, arc voltage U=24—26v;

b. in vertical position welding current I=180—190a, arc voltage U=21—22v.

The illustrated examples give a sufficient characteristic of the advantages of the proposed wire.

What we claim is:

1. A welding wire for open-arc welding and built-up welding of steel, consisting of a steel sheath with a powder core comprising, in percent of the core weight:

| | |
|---|---|
| marble | 8—15 |
| fluorite concentrate | 16—24 |
| rutile concentrate | 4—16 |
| soda ash | 4—18 |
| ferromanganese | 4—8 |
| ferrosilicon | 3—6 |
| alumina | 4—12 |
| sodium fluosilicate | 1—4, |
| the rest being iron powder. | |